United States Patent [19]

Nolan

[11] Patent Number: 5,021,710

[45] Date of Patent: Jun. 4, 1991

[54] INSECT ATTRACTION LAMP

[76] Inventor: James D. Nolan, 16 Pickett Ave., Spencer, N.C. 28159

[21] Appl. No.: 517,726

[22] Filed: May 2, 1990

[51] Int. Cl.⁵ .......................... H01J 1/62; H01J 61/35; H01J 61/40; H01K 1/26
[52] U.S. Cl. ................................. 313/489; 313/112; 313/635; 313/110; 252/401
[58] Field of Search ............... 313/489, 112, 635, 110; 427/389.7, 54.1, 67; 252/401; 43/112, 113

[56] References Cited

U.S. PATENT DOCUMENTS

| | | | |
|---|---|---|---|
| 3,602,759 | 8/1971 | Evans | 313/112 |
| 4,028,331 | 6/1977 | Hotta et al. | 252/401 |
| 4,248,005 | 3/1981 | Hedstrom | 43/112 |
| 4,490,937 | 1/1985 | Yaunieli | 43/112 |
| 4,507,332 | 3/1985 | Nolan et al. | 427/67 |
| 4,804,886 | 2/1989 | Nolan et al. | 313/635 |
| 4,924,368 | 5/1990 | Northroy et al. | 313/110 |

*Primary Examiner*—Donald J. Yusko
*Assistant Examiner*—Brian Zimmerman
*Attorney, Agent, or Firm*—R. Gale Rhodes, Jr.

[57] ABSTRACT

An insect attraction lamp including a lamp for transmitting black light perceptible to insects as an attractant, and a coating providing the lamp with a safety coating for containing debris produced upon the lamp being broken and for allowing transmission of the black light therethrough.

3 Claims, No Drawings

INSECT ATTRACTION LAMP

I have invented a new insect attraction lamp which includes a lamp for transmitting black light perceptible to insects as an attractant and a safety coating provided on the lamp for containing debris, such as broken glass or glass shards, produced upon the lamp being broken, and which safety coating allows transmission of the black light therethrough without substantial diminishment. Such containment of the glass shards prevents, or substantially reduces, the hazard presented to nearby people, exposed food, etc., upon the glass envelope of the insect attraction lamp being broken.

The lamp for transmitting the black light may be a suitable fluorescent lamp known to the art as a black light fluorescent lamp or black light blue fluorescent lamp. Such fluorescent lamps, as known, include a glass envelope provided at opposite ends with end caps from which protrude electrical connecting pins. Suitable commercially available black light fluorescent lamps are currently available from Sylvania, GTE Products Corporation, under the ordering abbreviations F20T1/350BL and F40/350BL, and suitable commercially available black light blue fluorescent lamps are currently available from Sylvania under the ordering abbreviations F20T12/BLB and F40BLB10PK. Other suitable commercially available black light fluorescent lamps are currently available from the Philips Lighting Company under the ordering codes F20T12/BL and F40BL, and suitable commercially available black light blue fluorescent lamps are currently vailable from Philips under the ordering codes F20T12/BLB and F40BLB.

The safety coating may include, by percentages of weight set forth below, plastic coating material, UV stabilizer and at least one antioxidant.

The plastic coating material may be ethylene-methacrylic acid copolymer, partial metal salt; and more particularly may be copolymer of ethylene with ethylenetically unsaturated carbocylic acid at least partially neutralized with a metal ion. Such plastic coating material is currently commercially available from E. I. Du Pont De Nemours & Company (Inc.) under the designation SURLYN 8660 [SURLYN is the registered trademark of Du Pont]. Preferably, the plastic coating material is about 99% by weight of the safety coating.

The UV stabilizer may be oligomeric ultraviolet light stabilizer of the hindered amine class, and more particularly may be Poly [(6-morpholino-s-triazine-2,4-diyl)[2,2,6,6-tetramethyl-4-piperidyl)imino]-hexamethylene [(2,2,6,6-tetramethyl-4-piperidyl)imino]]. Such UV stabilizer is currently commercially available from the American Cyanamid Company under the designation CYASORB UV 3346LD [CYASORB is the registered trademark of the American Cyanamid Company]. Preferably, the UV stabilizer is about 0.5% by weight of the safety coating.

Preferably, the antioxidant is comprised of at least two antioxidants each of which is about 0.15% by weight of the safety coating. One of the antioxidants may be a high molecular weight non-discoloring, non-staining antioxidant the symmetrical molecule of which includes four sterically hindered phenolic hydroxyl groups, and more particularly may be 2,2-bis[[3-[3,5-bis(1,1-Dimethylethyl)-4-hydroxyphenyl]-1-oxopropoxy]methyl]-1,3-propanediyl 3,5-bis (1,1-dimethylethyl)-4-hydroxybenzenepropanoate. Such antioxidant is presently commercially available from the Ciba-Geigy Corporation under the name IRGANOX 1010 [IRGANOX is the registered trademark of Ciba-Geigy]. The second antioxidant may be distearyl pentaerythritol diphosphite containing approximately 1% by weight of triisopropanol amine. Such antioxidant is currently commercially available from G.E. Plastics, General Electric Company, under the name WESTON 619 [WESTON is the registered trademark of Borg-Warner Chemicals, Inc.].

The plastic coating material, UV stabilizer and an antioxidant or antioxidants may be suitably mixed in the noted percentages by weight manually or may be mixed by suitable commercially available mixing machines. Such safety coating material may be employed in a suitable fluidized bed such as disclosed in U.S. Pat. No. 4,507,332 entitled METHODS FOR COATING THE GLASS ENVELOPE AND PREDETERMINED PORTIONS OF THE END CAPS OF A FLUORESCENT LAMP, patented Mar. 26, 1985, of which I am a co-inventor, and the safety coating material may be applied to the black light or black light blue fluorescent lamps using the coating methods disclosed in this patent. U.S. Pat. No. 4,507,332 is hereby incorporated herein by reference.

It will be understood that the above is a description of a preferred embodiment of my new insect attraction lamp, and it will be further understood that many variations and modifications may be made in my insect attraction lamp without departing from my invention.

What is claimed is:

1. Insect attraction lamp, comprising:
    lamp means for transmitting black light perceptible to insects as an attractant;
    coating means providing said lamp means with a safety coating for containing debris produced upon said lamp being broken and for allowing transmission of said black light therethrough; and
    said coating means including about 99% by weight of plastic coating material, about 0.5% by weight of UV stabilizer and about 0.3% by weight of at least one antioxidant.

2. Insect attraction lamp according to claim 1 wherein said lamp means is a fluorescent lamp including a glass envelope and end caps and wherein said coating means surround said glass envelope and sufficient portions of said end caps whereby upon said glass envelope being broken into glass shards said coating means maintain said glass shards and said end caps in association within said coating to prevent broadcasting of said glass shards.

3. Insect attraction lamp according to claim 1 wherein said plastic coating material is ethylene-methacrylic acid copolymer, partial metal salt; wherein said UV stabilizer is oligomeric ultraviolet light stabilizer of the hindered amine class; and wherein said at least one antioxidant comprises at least two antioxidants and wherein said first antioxidant is a high molecular weight non-discoloring, non-staining antioxidant including four sterically hindered phenolic hydroxyl groups and wherein said second antioxidant is distearyl pentaerythritol diphosphite and approximately 1% by weight of triisopropanol amine.

* * * * *